(12) United States Patent
Akarmann

(10) Patent No.: US 7,536,057 B2
(45) Date of Patent: May 19, 2009

(54) OPEN SYSTEM ARCHITECTURE FOR SURVEILLANCE SYSTEMS WITH EFFICIENT BANDWIDTH MANAGEMENT

(75) Inventor: Michael Akarmann, San Diego, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 668 days.

(21) Appl. No.: 11/263,461

(22) Filed: Oct. 31, 2005

(65) Prior Publication Data

US 2007/0098280 A1    May 3, 2007

(51) Int. Cl.
G06K 9/36    (2006.01)
(52) U.S. Cl. .................... 382/238; 382/236; 382/254
(58) Field of Classification Search ............. 382/254, 382/236, 238; 345/629, 632, 555, 557; 715/790; 348/430.1, E7.003; 375/E7.265
See application file for complete search history.

(56) References Cited

U.S. PATENT DOCUMENTS

| | | | |
|---|---|---|---|
| 4,646,148 A | | 2/1987 | Lienard et al. |
| 5,046,027 A | * | 9/1991 | Taaffe et al. ............... 345/557 |
| 5,179,651 A | * | 1/1993 | Taaffe et al. ............... 345/555 |
| 5,627,546 A | | 5/1997 | Crow |
| 6,061,562 A | | 5/2000 | Martin et al. |
| 6,157,337 A | | 12/2000 | Sato |
| 6,553,336 B1 | | 4/2003 | Johnson et al. |
| 6,628,941 B2 | | 9/2003 | Knoblach et al. |
| 6,665,594 B1 | | 12/2003 | Armstrong |
| 6,712,312 B1 | | 3/2004 | Kucik |
| 6,758,089 B2 | | 7/2004 | Breed et al. |
| 6,760,778 B1 | | 7/2004 | Nelson et al. |
| 6,873,341 B1 | * | 3/2005 | Adams et al. ............... 345/629 |
| 2003/0066932 A1 | | 4/2003 | Carroll |
| 2004/0021770 A1 | | 2/2004 | Krill |
| 2004/0130841 A1 | | 7/2004 | Murphy |
| 2004/0143602 A1 | | 7/2004 | Ruiz et al. |

FOREIGN PATENT DOCUMENTS

| | | |
|---|---|---|
| DE | 19625465 A1 | 1/1998 |
| EP | 0387013 A1 | 9/1990 |
| EP | 1351509 A2 | 10/2003 |

OTHER PUBLICATIONS

C. Y. Chang et al., "Spatial Compression of Seasat SAR Imagery", IEEE Transactions on Geoscience and Remote Sensing, vol. 26, No. 5, Sep. 1, 1988, pp. 673-685.
European Search Report, EP06121320, Apr. 24, 2007.

* cited by examiner

*Primary Examiner*—Anh Hong Do
(74) *Attorney, Agent, or Firm*—Robert P. Lenart, Esq.; Pietragallo Gordon Alfano Bosick & Raspanti, LLP

(57) ABSTRACT

A signal processing method comprises the steps of: receiving an image frame including a plurality of rows of pixel data words, wherein each of the rows includes a start pixel data word and a plurality of successive pixel data words; processing each row by subtracting each successive pixel data word in the row from the start pixel data word in the row to produce a plurality of difference pixel data words; and storing and/or transmitting the difference pixel data words. An apparatus that performs the method is also included.

12 Claims, 7 Drawing Sheets

$$I_{SAR\_STEREO} = f_1(x,y) = \begin{bmatrix} F_{1p}(0,0) & F_{1p}(0,1) & \cdots & F_{1p}(0,M-1) \\ F_{1p}(1,0) & F_{1p}(1,1) & \cdots & F_{1p}(1,M-1) \\ \cdots & \cdots & \cdots & \cdots \\ F_{1p}(N-1,0) & F_{1p}(N-1,1) & \cdots & F_{1p}(N-1,M-1) \end{bmatrix}$$

FRAME 1

$$I_{SAR\_STEREO} = f_2(x,y) = \begin{bmatrix} F_{2p}(0,0) & F_{2p}(0,1) & \cdots & F_{2p}(0,M-1) \\ F_{2p}(1,0) & F_{2p}(1,1) & \cdots & F_{2p}(1,M-1) \\ \cdots & \cdots & \cdots & \cdots \\ F_{2p}(N-1,0) & F_{2p}(N-1,1) & \cdots & F_{2p}(N-1,M-1) \end{bmatrix}$$

FRAME 2

FIG. 4

OPEN SYSTEM ARCHITECTURE FOR SURVEILLANCE SYSTEMS WITH EFFICIENT BANDWIDTH MANAGEMENT

STATEMENT OF GOVERNMENT INTEREST

This invention was made under Contract No. F33657-01-C-4600. The United States Government has rights in this invention under the contract.

FIELD OF THE INVENTION

This invention relates to methods and apparatus for data acquisition and processing in surveillance systems.

BACKGROUND OF THE INVENTION

Reconnaissance, surveillance and target acquisition systems can include a plurality of airborne platforms or air vehicles, each carrying a plurality of sensors that are used to collect information about an area under surveillance. The airborne platforms can communicate with requesters, which can include persons or equipment, that desire access to data collected by the sensors and may be located in one or more ground stations. Complex surveillance systems can include a plurality of communications and sensor systems that collect information about an environment, process that information to obtain meaningful intelligence, and communicate the information to an entity that can take action based on the information.

Synthetic Aperture Radar (SAR), Electro-optical (EO) or infrared (IR) sensors can be used to produce images of areas of interest. These images can include a large amount of data that must be rapidly processed and communicated to various equipment and/or users of the surveillance system. Communication bandwidth, the amount of data to be transmitted, and the distance the data must be communicated, all affect response time.

Network bandwidth speeds, as well as sensor throughput rates, are increasing at rates that are faster than the latest blade servers can deal with effectively. A 1 Gb/s Ethernet is deployed in a current surveillance system architecture with 10 Gb/s Ethernet being a planned replacement due to increasing throughput demands levied by such advanced payloads as hyperspectral and HDTV sensors. The blade servers are becoming an input/output (I/O) bottleneck and the limiting factor in high bandwidth data network transfers. This is due in part to the multiple internal copies of payload data that need to be made. This can overwhelm the internal memory bus of the blade central processing unit (CPU).

It would be desirable to standardize the sensors and communications data link interfaces at both lower and upper levels to allow for sensors, communications data links, and ground station upgrades. It would also be desirable to have a system with sufficient bandwidth to provide for near real time signal processing and communications. Therefore, there is a need for a data processing system that can reduce the time required for disseminating the collected information.

SUMMARY OF THE INVENTION

This invention provides a signal processing method comprising the steps of: receiving an image frame including a plurality of rows of pixel data words, wherein each of the rows includes a start pixel data word and a plurality of successive pixel data words; processing each row by subtracting each successive pixel data word in the row from the start pixel data word in the row to produce a plurality of difference pixel data words; and storing and/or transmitting the difference pixel data words.

The invention further encompasses an apparatus comprising: an input for receiving an image frame including a plurality of rows of pixel data words, wherein each of the rows includes a start pixel data word and a plurality of successive pixel data words; a processor for processing each row by subtracting each successive pixel data word in the row from the start pixel data word in the row to produce a plurality of difference pixel data words; and a memory for storing the difference pixel data words.

In another aspect, the invention includes a signal processing method comprising the steps of: receiving corresponding image frames, each including a plurality of pixel data words; processing the image frames by subtracting each of the pixel data words in a second one of the image data frames from a corresponding pixel data word in a first one of the image frames to produce a plurality of difference pixel data words; and storing and/or transmitting the difference pixel data words.

The invention further encompasses an apparatus comprising: an input for receiving corresponding image frames, each a plurality of pixel data words; a processor for processing the image frames by subtracting each of the pixel data words in a second one of the image data frames from a corresponding pixel data word in a first one of the image frames to produce a plurality of difference pixel data words; and a memory for storing the difference pixel data words.

BRIEF DESCRIPTION OF THE DRAWINGS

FIG. 4 is an N×M matrix representation of imagery pixels for a synthetic aperture radar (SAR) image.

DETAILED DESCRIPTION OF THE INVENTION

Figure 1:
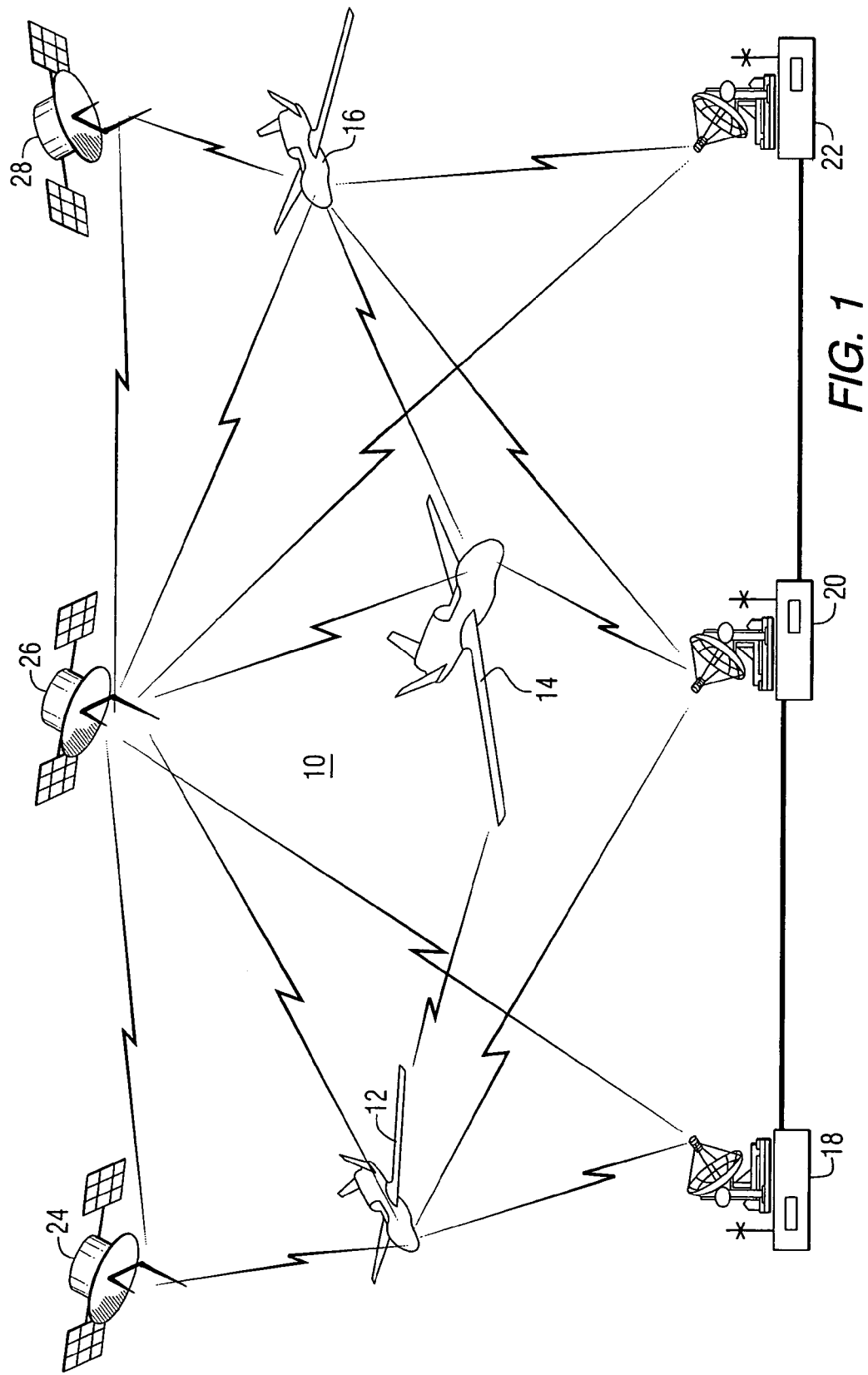
FIG. 1 is a schematic representation of a surveillance system that includes components constructed in accordance with this invention.

Referring to the drawings, FIG. 1 is a schematic representation of a surveillance system 10 that includes components constructed in accordance with this invention. The system includes a plurality of sensor platforms, which can be unmanned air vehicles (UAVs) 12, 14 and 16. Each of the sensor platforms carries one or more sensors for supplying information about an area under surveillance. The UAVs can communicate with a plurality of ground stations 18, 20 and 22, and a plurality of satellites 24, 26 and 28. Communication links are provided among the various system components to achieve the desired functionality.

One type of surveillance system uses an Advanced Payload Processor Unit (APPS) architecture, which is an open source architecture (OSA) that was designed to support a server-inthe-sky node within the concept of Network Centric Enterprise Systems (NCES). Such systems need to handle high volume data transfers at network bandwidth speeds that are supported by at least 1 Gb/s or beyond network fabrics like PICMG 2.16. This applies equally well to server-to-server, server-to-client(s), or server-to-storage applications, whether the storage is on-board the aircraft, like the Advanced Information Architecture (AIA), or off-board.

Figure 2:
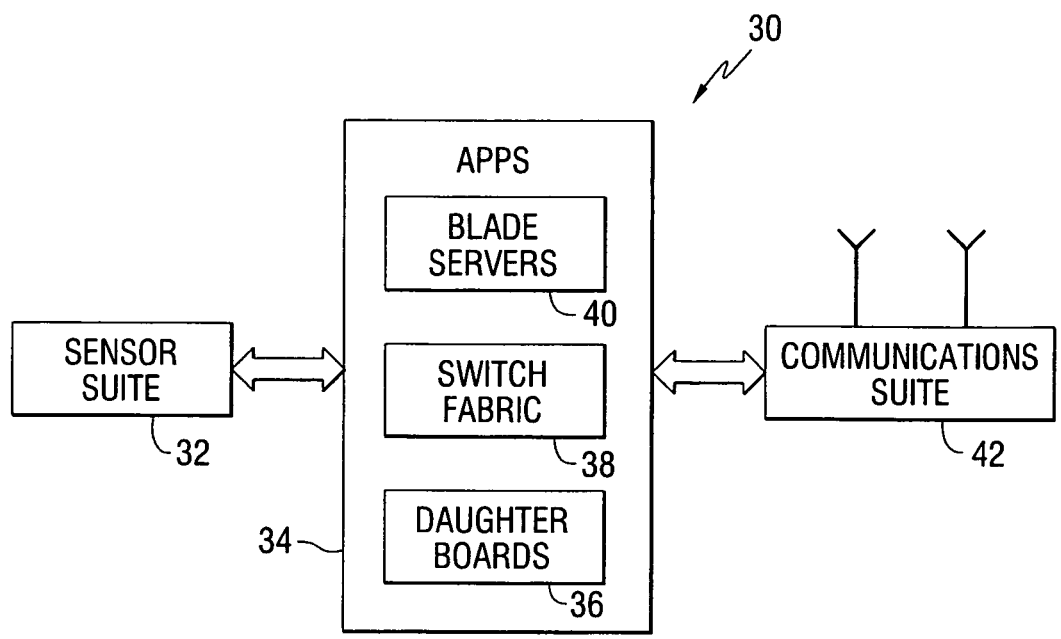
FIG. 2 is a block diagram of a portion of a surveillance system that includes the invention.

FIG. 2 is a block diagram of a portion of a surveillance system 30 that includes the invention. The system includes a sensor suite 32 that can include one or more sensors such as electro-optical sensors, infrared sensors, or synthetic aperture radar, which can be used to produce images of an area of interest. The sensors send signals representative of information in the images to an Advanced Payload Processor Unit (APPS) 34. The APPS includes a variety of circuits, including signal processing circuits that can be implemented using daughter boards 36, switching circuits 38, and blade servers 40. The components of the APPS can be commercially available off-the-shelf components that have been modified to provide improved data throughput. For example, firmware that provides operations that are not needed in this application can be disabled. The APPS processes the image information and sends the processed information to a communications suite 42 that transmits the information to users or other equipment in the surveillance system.

This invention provides an open systems architecture that leverages state of the art Commercial Off-The-Shelf (COTS) GigaBit Ethernet (GbE) switch/router technology, coupled with state-of-the-art PICMG 2.16 based switch fabric technology, to address the ever-increasing demands of the Intelligence Surveillance & Reconnaissance (ISR) sensor collection throughput rates, which can reach 10 Gbps (Gigabit per second).

The APPS architecture is suitable for Command, Control, Communications, Computers, Intelligence, Surveillance, and Reconnaissance (C4ISR) applications for flexible and robust performance to address the challenge of ever-increasing sensor data rates and to provide a graceful migration path to the 10 Gb/s Ethernet data network connectivity.

The APPS architecture partially addresses the blade CPU utilization (saturation) problem by implementing a combination of techniques, among them Transmission Control Protocol (TCP) Offload Engine (TOE), and Remote Direct Memory Access (RDMA). This invention leverages these open standards technique in a novel implementation of the EO/IR and/or SPOT image processing that increases the available network bandwidth for C4ISR sensors by performing efficient bandwidth management at speeds that are near wire speed.

Figure 3:
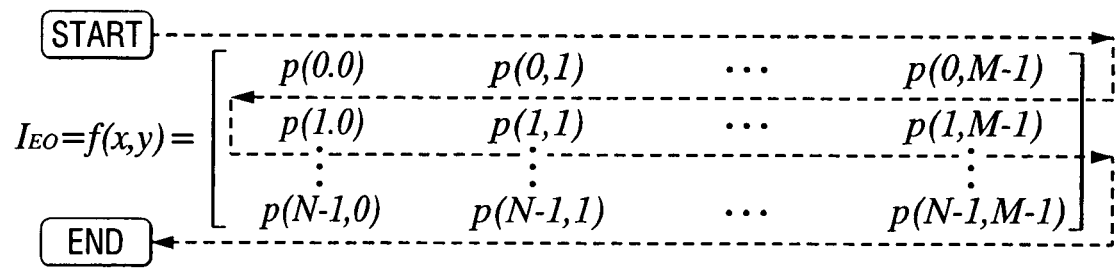
FIG. 3 is an N×M matrix representation of imagery pixels for an electro-optical (EO) image.

Two practical bandwidth management applications of this invention are for EO Spot image, and SAR stereo image processing. FIG. 3 is an N×M matrix representation of imagery pixels for an EO image. FIG. 4 is an N×M matrix representation of the imagery pixels for corresponding frames of a synthetic aperture radar image. As used herein, corresponding image frames are frames of images of the same target or area of interest. The pixels in FIGS. 3 and 4 are arraigned in a matrix of N rows and M columns. Each pixel is identified as P(x,y), where x is the row and y is the column. The F in front of the pixel label refers to the image frame number.

Figure 5:
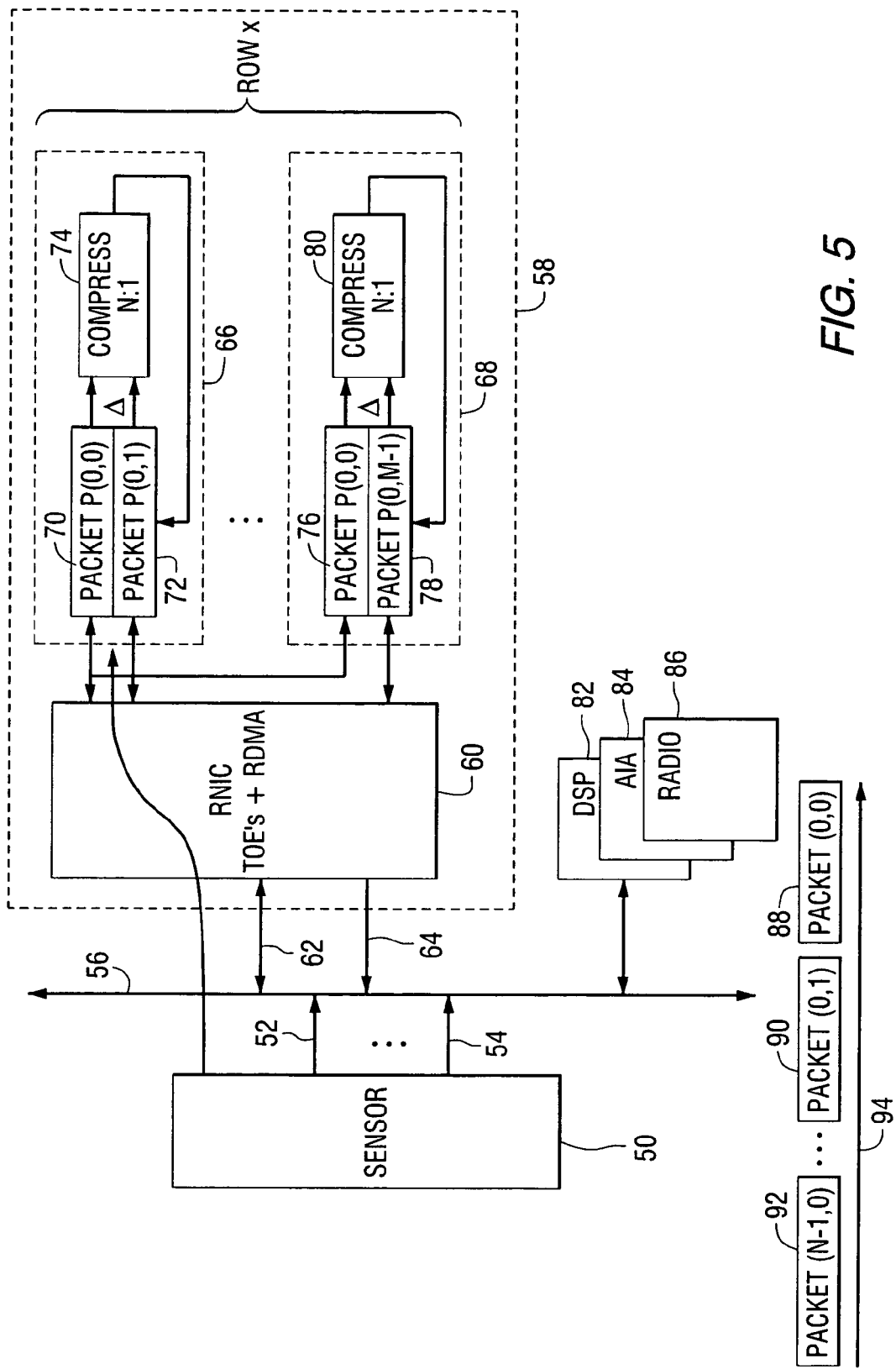
FIG. 5 is a block diagram of a portion of the system of FIG. 2 as used for EO image processing.

FIG. 5 is a block diagram of a portion of the system of FIG. 2 that illustrates EO Intra_Frame packet processing, where a packet, also referred to as a data word or a pixel data word, is an 8-bit (or more) digitized representation of a pixel. A plurality of sensors 50, which can be for example electro-optic or infrared sensors, capture image data and transmit the data on a plurality of Ethernet channels 52, 54, to a PICMG 2.16 switch fabric, illustrated as line 56. A plurality of blade servers 58 (only one of which is shown in this figure) are connected to the Ethernet. Each server includes a Remote Network Interface Card (RNIC) 60 that receives data from, and delivers data to, the PICMG 2.16 switch fabric as illustrated by lines 62 and 64. The image data includes pixel data that is representative of images captured by the sensors. Henceforth in this description, packets, data words, and pixel data words are used interchangeably.

The example of FIG. 5 illustrates intra-frame processing of electro-optical images having pixel data as shown in FIG. 3. The data is delivered to the RNIC in separate Megabyte (Mbyte) blocks, each comprised of a set of 8-bit packets that represent the intensity of each pixel in a frame of an image.

For an N×M EO Image, the blade server includes M-2 modular blocks per row of pixels in the image. Two of these modular blocks, 66 and 68, are shown in FIG. 5. Modular block 66 includes two buffers 70, 72 and a compression device 74. Modular block 68 includes buffers 76, 78, and compression device 80. The EO Imagery frame is assumed to start at pixel P(0,0) in FIG. 3. The first buffer of each modular block is filled with the first pixel of each row following the serpentine path outlined in FIG. 3. The second buffer in each modular block is filled with a second pixel from the row, which in this case is P(0,1). The second modular block is filled with P(0,0) and P(0,2), and so on until the modular block M-2 is reached. Modular block M-2 compares pixels P(0,0) and P(0, M-1). The second pixel in each pair of buffers is subtracted from the first pixel to produce a difference (or delta) pixel value. This difference data can be stored in the location of the second pixel of each pixel pair. The delta difference values are compressed data. However, if further compression is desired, there are other compression techniques like delta encoding, or standard JPEG200, that can be applied to the difference values to further compress the data. In its simplest form, delta encoding can be performed as follows:

Assume eight (8) pixels of original image data having brightness values of: 127 129 130 137 129 131 133 128. Then the number of bits used to represent this data is: 8---8---8---8---8---8---8---8, for a total of 64 bits.

The compressed image data would be the brightness value for the first pixel and the values for the difference between each successive pixel and the first pixel. Thus the compressed image data is: 127+2+3+10+2+4+6+1. Then the number of bits used to represent this data is: 8---4---4---4---4---4---4---4, for a total of 36 bits. Thus the compression ratio is: 64/36~2:1.

Only the first edged (start) 8-bits pixel brightness value (i.e., 8-bits) is sent, along with the delta between the first pixel value and the successive pixels. The original pixel brightness for any pixel in the row can be reconstructed from the full value (uncompressed) brightness of the edge (start) pixel and the delta's for the successive pixels.

The above is a typical example of the reduction in the required bit rates needed to downlink the data to the ground via a limited data rate pipe (data link). In an alternative embodiment, the pixel delta values can be determined by taking the difference between successive pixels in each row. For the example given above, with original image data having brightness values of: 127 129 130 137 129 131 133 128, the compressed image data is: 127+2+1+7−8+2+2−5. Again, the number of bits used to represent this data is: 8---4---4---4---4---4---4---4, for a total of 36 bits. Thus the compression ratio is: 64/36~2:1.

Following processing of the pixel data in row number 1, processing proceeds in row number 2 starting with pixel P(1, M-1). The same modular blocks are used to process the pixel data of row number 2. Processing proceeds using a serpentine path through the image data. The use of a serpentine path de-correlates the successive reference points for each row. Theoretically, the two reference points taken at the extreme of each successive row should be de-coupled.

When all the rows have been processed, pixels at locations P(0,0), P(1,M-1), . . . . P9N-1, M-1) will have their original values, while the other pixels will have a compressed representation value relative to the lead (or start) pixel of each row. The lead pixel of each row could also be compressed if transmission bandwidth limitations require it.

The modular blocks in FIG. 5 show that the delta pixel value as a result, for example, of subtracting P(0,1) from P(0,0) data is compressed and stored in the P(0,1) location. In the above examples, the 8-bit pixel data is compressed to 4-bit pixel data. The compressed pixel data is then delivered to the PICMG 2.16 switch fabric and distributed to a digital signal processor 82, AIA 84, and/or radio 86 for further processing or transmission.

Packets 88, 90, 92 arrive in a serial stream as illustrated by arrow 94, and the process described above is repeated for each row of pixel data. The invention provides, at near wire speed, a bandwidth efficient management implementation of the processing for image frames that are generated as a result of an EO or IR SPOT imagery scene collection performed by the surveillance system.

The APPS blade in FIG. 5 has a dual port bi-directional Remote Network Interface Card (RNIC) that performs both TOE's and RDMA on the incoming frames. In this example, each packet includes an image frame with an average 1008× 1018 pixels per frame.

Figure 6:
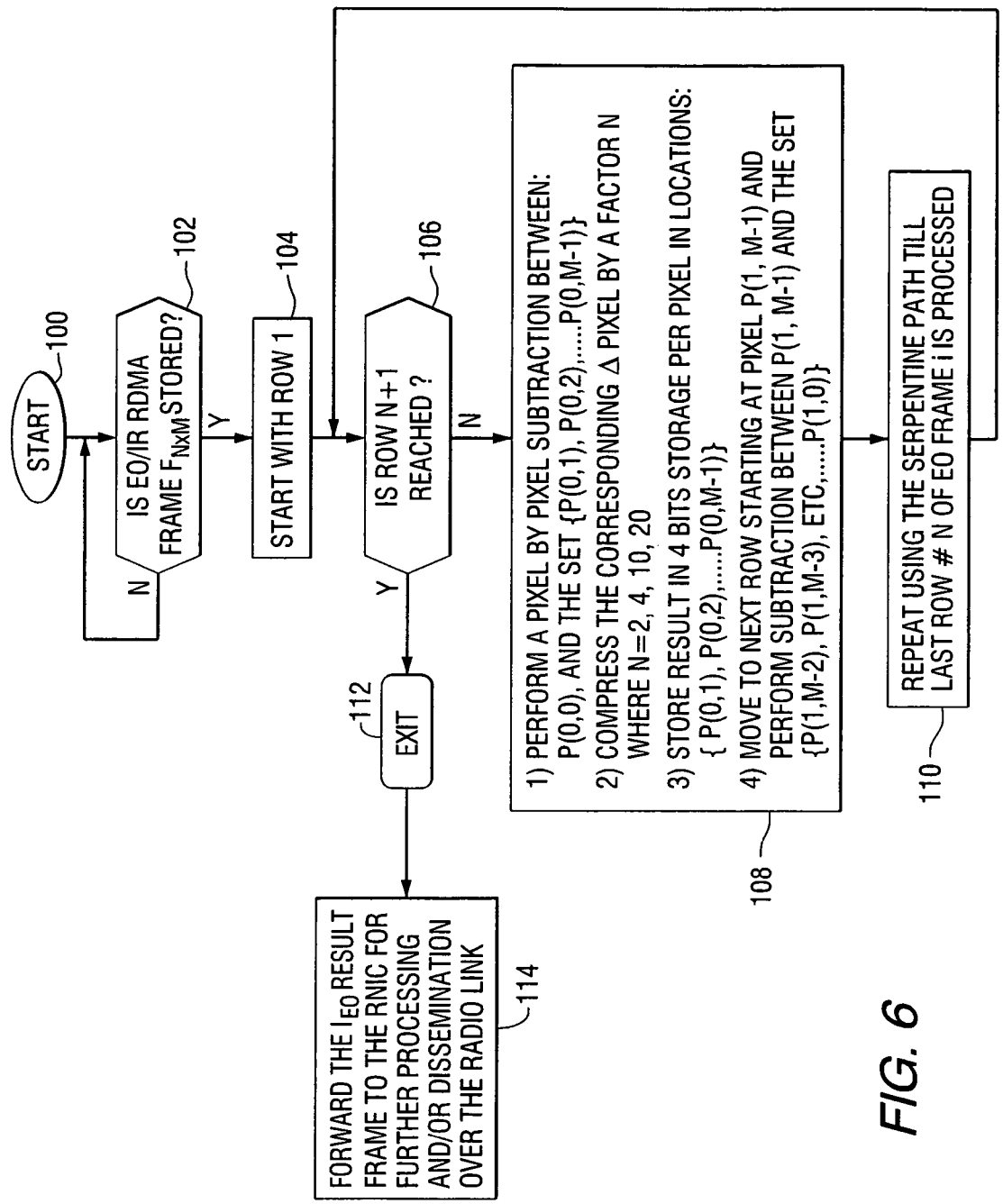
FIG. 6 is a flow diagram showing a method of processing image data in accordance with a first aspect of the invention.

FIG. 6 illustrates the process by which the various EO/IR sensor frames are processed upon arrival to the APPS blade. Each sensor channel is processed by one APPS blade. The current data networking configuration provides 1 Gb/s Ethernet connectivity, which could easily be upgraded to 10 Gb/s Ethernet.

FIG. 6 provides a step-by-step description of the method of collecting EO/IR scene frames using an efficient bandwidth management technique. In one embodiment of the invention, the process starts at block 100, with each incoming frame consisting of 1008×1018 pixels, requiring 8 bits/pixel of storage space. The frame, which is UDP/IP and Ethernet encapsulated, is deencapsulated in the RNIC (using TOE's) and the raw imagery pixels are stored in a predetermined storage location via RDMA from the sensor to the APPS blade (zero copy). After the frame is stored as shown in block 102, the processing starts with row 1 as shown in block 104. If the last row has not been reached (block 106), pixel-by-pixel subtraction, compression and storage of the compressed data proceeds as described above and as shown in block 108. Block 110 shows that this is repeated for each row using the serpentine path shown in FIG. 3. When row N-1 is reached, the process is completed 112, and the compressed frame is sent to the RNIC for further processing and/or dissemination, as shown in block 114.

The processed frames that belong to the same EO/IR scene collection could then be RDMA (at throughput rates that are much lower than the throughput rates that would be required for unprocessed image data) over the PICMG 2.16 1 Gb/s switch fabric, to the AIA for storage, or the radio for transmission, or the DSP for further processing, or all of the preceding destinations via a multicast operation.

A typical EO/IR SPOT scene will have 10 frames across a track, and 14 frames along the track, for a total of 140 frames. The process is repeated until all 140 frames are processed. The processed frames are then re-encapsulated in UPD/IP and Ethernet.

This invention also encompasses SAR stereo image interframe processing. SAR stereo imaging captures multiple images of the same spot in order to enhance the resolution of the SAR image from that spot beyond the resolution of a single image. The SAR stereo imaging process, by its nature, is bandwidth intensive. The invention's objective is to perform a bandwidth data reduction by performing a pixel-by-pixel comparison between each pixel in the corresponding SAR stereo images frames that are being collected on the targeted spot.

Figure 7:
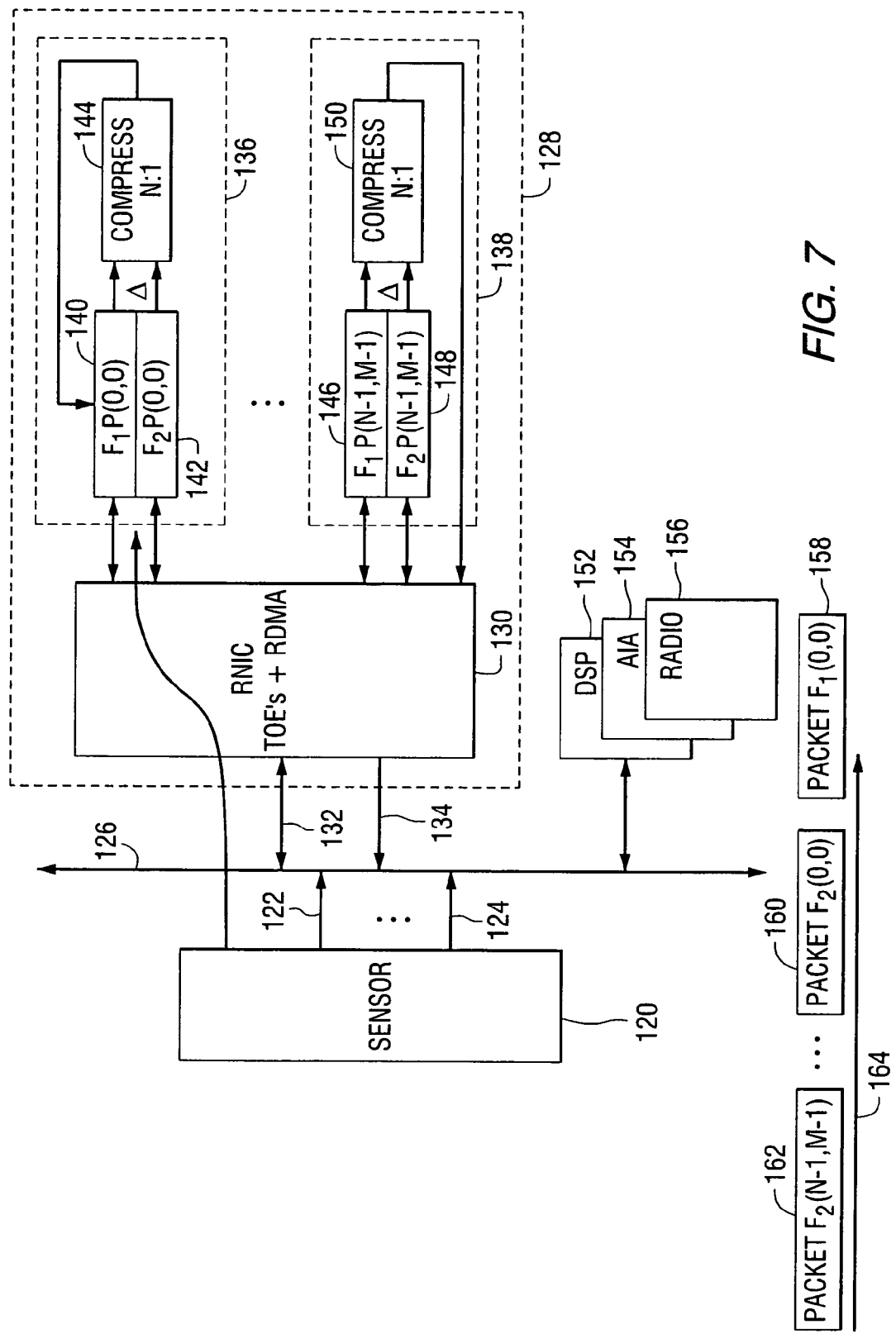
FIG. 7 is a block diagram of a portion of the system of FIG. 2 as used for SAR image processing.

FIG. 7 is a block diagram of a portion of the system of FIG. 2 that illustrates SAR inter-frame stereo processing, where a packet, also referred to as a data word or a pixel data word, is an 8-bit (or more) digitized representation of a pixel. A plurality of sensors 120, capture SAR image data and transmit the data on a plurality of Ethernet channels 122, 124, to a PICMG 2.16 switch fabric, illustrated as line 126. A plurality of blade servers 128 (only one of which is shown in this figure) are connected to the Ethernet. Each server includes a Remote Network Interface Card (RNIC) 130 that receives data from, and delivers data to, the PICMG 2.16 switch fabric as illustrated by lines 132 and 134. The image data includes pixel data that is representative of images captured by the sensors.

The example of FIG. 7 illustrates inter-frame processing of SAR images having pixel data as shown in FIG. 4. The data is delivered to the RNIC in separate Megabytes (Mbytes) blocks, each comprised of a set of 8-bit packets that each represent pixel intensity.

For a SAR Image, the blade server includes M modular blocks per row of pixels in the image. Two of these modular blocks, 136 and 138, are shown in FIG. 7. Modular block 136 includes two buffers 140, 142 and a compression device 144. Modular block 138 includes buffers 146, 148, and compression device 150. Two successive SAR imagery frames are shown in FIG. 4. Corresponding pixels in the successive frames are illustrated using dotted arrows. The first buffer of each modular block is filled with a first pixel, for example $F_1P(0,0)$, of the first frame of FIG. 4. The second buffer in the first modular block is filled with a corresponding pixel from the second frame, which in this example is $F_2P(0,0)$. The second modular block is filled with pixels $F_1P(0,1)$ and $F_2P(0,1)$, and so on until the modular block M-1 is reached. Modular block M compares pixels $F_1P(N-1,M-1)$ and $F_2P(N-1,M-1)$. The second pixel in each pair of corresponding pixels is subtracted from the first pixel to produce a difference (or delta) pixel value. The difference values have smaller magnitudes than the original pixel values and can be represented by smaller data words. This difference data is stored in locations that formerly held the second frame data. If further compression is desired, an associated compression device can be added to apply known compression techniques to further compress the difference data.

As in the above example, the 8-bit pixel data can be compressed to 4-bit pixel data. The compressed pixel data is then delivered to the PICMG 2.16 switch fabric and distributed to a digital signal processor 152, AIA 154, and/or radio 156 for further processing or transmission.

Data packets 158, 160, 162 arrive in a serial stream as illustrated by arrow 164, and the process described above is repeated for successive frames of pixel data. The invention provides, at near wire speed, a bandwidth efficient management implementation of the processing of image frames that are generated as a result of an SAR imagery scene collection performed by the surveillance system.

For the SAR example, the frames of SAR stereo pixels that are being compared are shown in FIG. 4 for a representative N×M matrix. In this case, each row will have M modular blocks. In the first modular block, $F_1P(0,0)$ is compared to $F_2P(0,0)$ for the successive collected frames Frame 1 and Frame 2. The delta result is compressed and stored in the $F_2P(0,0)$ location. When all the N×M pixels are compared, the Frame 1 matrix along with the modified Frame 2 matrix is forwarded, via the RNIC, over the PCIMG 2.16 bus for further processing and/or radio transmission.

Figure 8:
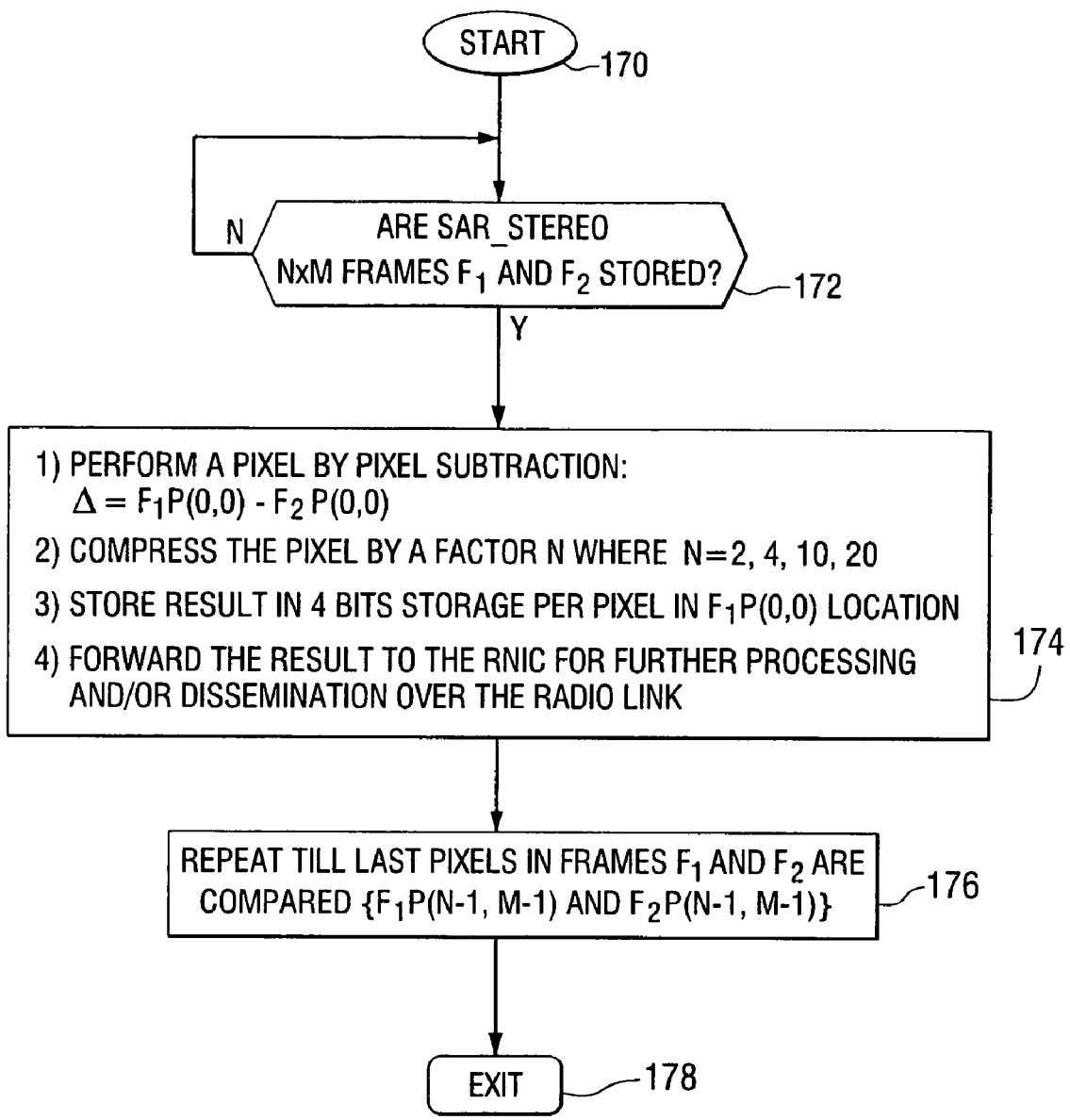
FIG. 8 is a flow diagram showing a method of processing image data in accordance with a second aspect of the invention.

FIG. 8 is a flow chart that illustrates the SAR stereo interframe processing algorithm. FIG. 8 illustrates the process by which the various SAR sensor frames are processed upon arrival at the APPS blade. Each sensor channel is processed by one APPS blade. The current data networking configuration provides 1 Gb/s Ethernet connectivity, which could easily be upgraded to 10 Gb/s Ethernet.

FIG. 8 provides a step-by-step description of the method of collecting EO/IR scene frames using an efficient bandwidth management technique. In one embodiment of the invention, the process starts at block 170, with each incoming frame consisting of 1008×1018 pixels, requiring 8 bits/pixel of storage space. The frame, which is UDP/IP and Ethernet encapsulated, is deencapsulated in the RNIC (using TOE's) and the raw imagery pixels are stored in a predetermined storage location via RDMA from the sensor to the APPS blade (zero copy). After the frame is stored as shown in block 172, the processing continues as shown in block 174 by performing a pixel-by-pixel subtraction, compression and storage of the compressed data as described above. Block 176 shows that this is repeated until the last pixels of the two frames of interest have been compared. When row N−1 and column M-1 have been reached, the process is completed, and the compressed frame is sent to the RNIC for further processing and/or dissemination, as shown in block 178.

The 1008×1018 pixels represented by 8-bits/pixel in frame F+1, are subtracted from their counterpart 1008×1018, 8-bits pixels in the preceding frame F. The result is compressed by a factor N; for example where N=2, 4, 10, or 20, and stored in the same location as the original pixel location of frame F+1 but this time using a 4-bits/pixel storage location.

For the delta encoding compression example shown above, 4 bits (which is ½ a byte) were used for simplicity, even though 4-bits might not be needed in each instance. The compression ratio is a function of the compression algorithm to be used.

The same operation is performed on frames F+1 and F+2 and the result is stored. This process is repeated until the last frame is received. The method illustrated in FIG. 8 describes the processing performed on two successive frames; F and F+1 respectively. The processed frames that belong to the same SAR scene collection could then be RDMA (at throughput rates that are much lower than the throughput rates that would be required for unprocessed image data) over the PICMG 2.16 1 Gb/s switch fabric, to the AIA for storage, or the radio for transmission, or the DSP for further processing, or all of the preceding destinations via a multicast operation.

This invention can be implemented using an OSA architecture with commercial off-the-shelf (COTS) components, including for example, known servers, processors, switch fabrics, etc., thus drastically reducing the cost of the end product. Bi-directional, full duplex, dedicated, non-conflicting, non-blocking pathways are provided between the UAV airborne platform and the ground control element.

Robust redundancy is provided in the OSA architecture. The OSA architecture can be upgraded to leverage advances in switch fabric technology ever-increasing throughput rates while preserving the software/firmware investment.

The system can provide a "plug & play" OSA architecture that can service various multi-intelligence sensors as well as various networked data links. The UAV can provide a mobile server-in-the-sky.

On-board advanced sensor processing can include, for example, Automatic Target Cueing (ATC); Mosaicing; Automatic Target Recognition (ATR); Multi-Hypothesis Tracking (MHT); Coherent Change Detection (CCD); Digital Terrain Elevation Data (DTED) Generation; Sensor Data Fusion; Sensor Cross-Cueing; Lossless/JPEG2000 Compression; Intelligent Bandwidth Compression; See & Avoid (Collision Avoidance); Radar Warning Receiver Rehost; and Red/Black Separation.

The system allows remote sensor payload control, and is compatible with ASARS-2A links. It supports the physical separation of flight management functions from non-flight management functions. Red and black encryption schemes can be defined. Future multi-intelligence payloads and communications links can be supported.

While the invention has been described in terms of several embodiments, it will be apparent to those skilled in the art that various changes can be made to the described embodiments without departing from the scope of the invention as set forth in the following claims.

What is claimed is:

1. A signal processing method comprising the steps of:
    using an input to receive an image frame including a plurality of rows of pixel data words;
    each of the rows including a start pixel data word and a plurality of successive pixel data words;
    using a processor to subtract each successive pixel data word in each row from the start pixel data word in the row to produce a plurality of difference pixel data words; and
    storing the difference pixel data words in a buffer.

2. The method of claim 1, wherein the start pixels of successive rows are at opposite ends of the successive rows.

3. The method of claim 1, wherein the difference pixel data words comprise four bits per pixel.

4. The method of claim 1, wherein the processor compresses the difference pixel data words by a factor of 2, 4, 10 or 20.

5. The method of claim 1, wherein the frame comprises electro-optical or infrared image data.

6. An apparatus comprising:
    an input for receiving an image frame including a plurality of rows of pixel data words, wherein each of the rows includes a start pixel data word and a plurality of successive pixel data words;
    a processor for subtracting each successive pixel data word in each row from the start pixel data word in the row to produce a plurality of difference pixel data words; and
    a memory for storing the difference pixel data words.

7. A signal processing method comprising the steps of:
    using a synthetic aperture radar to produce corresponding image frames of a spot, each image frame including a plurality of pixel data words;
    using a processor to process the image frames by subtracting each of the pixel data words in a second one of the image data frames from a corresponding pixel data word in a first one of the image frames to produce a plurality of difference pixel data words; and
    storing the difference pixel data in a buffer.

8. The method of claim 7, wherein the difference pixel data words comprise four bits per pixel.

9. The method of claim 7, wherein the processor compresses the difference pixel data words by a factor of 2, 4, 10 or 20.

10. An apparatus comprising:
- a synthetic aperture radar producing corresponding image frames of a spot, each image frame including a plurality of pixel data words;
- a processor for processing the image frames by subtracting each of the pixel data words in a second one of the image data frames from a corresponding pixel data word in a first one of the image frames to produce a plurality of difference pixel data words; and
- a memory for storing the difference pixel data words.

11. The apparatus of claim 10, wherein the difference pixel data words comprise four bits per pixel.

12. The apparatus of claim 10, wherein the processor compresses the difference pixel data words by a factor of 2, 4, 10 or 20.

* * * * *